United States Patent

Hattori et al.

[11] Patent Number: 6,043,957
[45] Date of Patent: Mar. 28, 2000

[54] HEAD POSITIONING MECHANISM FOR MAGNETIC DISK DEVICE PROVIDED WITH MICRO TRACKING ACTUATOR USING MAGNETIC FORCE AND DRIVE CONTROL METHOD THEREFOR

[75] Inventors: Toshiro Hattori; Hiroshi Kajitani; Masatomo Mizuta; Yoshiho Yanagita, all of Tokyo, Japan

[73] Assignee: NEC Corporation, Tokyo, Japan

[21] Appl. No.: 09/045,851

[22] Filed: Mar. 23, 1998

[30] Foreign Application Priority Data

Mar. 21, 1997 [JP] Japan ..................... 9-067980

[51] Int. Cl.[7] ................ G11B 5/55; G11B 5/56
[52] U.S. Cl. ............................. 360/106; 360/109
[58] Field of Search .................... 360/105, 106, 360/109; 310/13

[56] References Cited

U.S. PATENT DOCUMENTS

| | | | |
|---|---|---|---|
| 5,122,702 | 6/1992 | Nakazato | 310/13 |
| 5,521,778 | 5/1996 | Boutaghou et al. | 360/106 |
| 5,621,591 | 4/1997 | Rahimi et al. | 360/106 |
| 5,764,441 | 6/1998 | Aruga et al. | 360/109 |
| 5,781,381 | 7/1998 | Koganezawa et al. | 360/106 |
| 5,796,558 | 8/1998 | Hanrahan et al. | 360/106 |
| 5,936,805 | 8/1999 | Imaino | 360/104 |

FOREIGN PATENT DOCUMENTS

| | | |
|---|---|---|
| 2263369 | 10/1990 | Japan . |
| 4232678 | 8/1992 | Japan . |

*Primary Examiner*—Craig A. Renner
*Assistant Examiner*—Angel Castro
*Attorney, Agent, or Firm*—Sughrue, Mion, Zinn Macpeak & Seas, PLLC

[57] ABSTRACT

In a head positioning mechanism has a micro tracking actuator which is between a carriage and a supporting spring for making the supporting spring be rotated relative to the carriage to adjust a position of a magnetic head, the micro tracking actuator has a pair of coils held to one of said carriage and said supporting spring. Each of the coils generates magnetic flux in response to a flow of electric current therein. The micro tracking actuator further has a magnet arrangement held to another of the carriage and the supporting spring to face the coil means in a predetermined direction. The magnet arrangement traverses the magnetic flux to have a particular size which varies in accordance with a predetermined relation in response to a relative movement between the coils and the magnet arrangement. The carriage is movably mounted to a magnetic disk device to which the head positioning mechanism applied. The supporting spring is attached to the carriage and rotatable around a predetermined axis extending in the predetermined direction. The supporting spring holds the magnetic head to perform a seeking operation of the magnetic head in cooperation with the carriage.

10 Claims, 10 Drawing Sheets

HEAD POSITIONING MECHANISM FOR MAGNETIC DISK DEVICE PROVIDED WITH MICRO TRACKING ACTUATOR USING MAGNETIC FORCE AND DRIVE CONTROL METHOD THEREFOR

BACKGROUND OF THE INVENTION

The present invention generally relates to a head positioning mechanism for a magnetic disk device provided with a micro tracking actuator which uses a magnetic force, and to a drive control method therefor. More particularly, the present invention relates to a head positioning mechanism for use in a magnetic disk device, which is used for precisely fixing the positional relation between a carriage and a supporting spring when performing a seeking operation of moving a magnetic head to a target track of a magnetic disk medium (hereunder referred to as a magnetic disk), and to a drive control method therefor.

In the case of a conventional magnetic disk device, a seeking operation of moving a magnetic head to a target track of a magnetic disk is performed by an actuator. The magnetic head is moved to a target track in a control mode. Further, the conventional magnetic disk device is adapted so that the magnetic head is held on the target track in a position control mode after the magnetic head reaches the target track.

In the case of such a conventional magnetic disk device, the movement of a magnetic head is performed by using a carriage and a supporting spring which are connected to an actuator. However, recently, as the storage capacity of a magnetic disk is considerably increased, an actuator is required to have high accuracy of positioning of a magnetic head. To enhance the accuracy of positioning of a magnetic head, there has been proposed a system which uses a micro tracking actuator for performing a seeking operation of moving a magnetic head by a minute distance.

For example, a magnetic disk device employing a minute displacement generating element as the micro tracking actuator has been known as such a conventional system. In the case of this conventional system, when performing a (high-precision) seeking operation of moving a magnetic head to a target track of a magnetic head, a (coarse) seeking operation of moving the magnetic head to the target track is first performed. Then, the actuator is stopped. Subsequently, the positioning of the magnetic head by means of the minute displacement generating element according to a position error signal is performed as a precise seeking operation of moving the magnetic head.

Moreover, there has been another conventional magnetic disk device provided with a micro tracking actuator using a magnetic force. This magnetic disk device is provided with a carriage and a supporting spring.

However, in the case of the former magnetic disk device using the minute displacement element, a high voltage is necessary for driving the element. Further, the minute displacement generating element has drawbacks in that the long-term reliability thereof is low and thus, the practicality thereof is low.

Furthermore, in the latter case, namely, in the case of the micro tracking actuator using a magnetic force, the supporting spring is vibrated owing to the seeking operation. Thus, such a micro tracking actuator has a drawback in that it is difficult to achieve the complete fixation thereof.

SUMMARY OF THE INVENTION

Accordingly, an object of the present invention is to provide a head positioning mechanism for a magnetic disk device, which can perform the functions of the conventional micro tracking actuator by employing a physically single configuration, and to provide a drive control method therefor.

Further, another object of the present invention is to provide a head positioning mechanism for a magnetic disk device, by which a reduction in size of the head positioning mechanism is achieved, and to provide a drive control method therefor.

Moreover, still another object of the present invention is to provide a head positioning mechanism for a magnetic disk device, by which a position control operation can be easily performed, and to provide a drive control method therefor.

According to an aspect of this invention, there is provided a head positioning mechanism for a magnetic disk device. The head positioning mechanism is for positioning a magnetic head on a magnetic disk set to the magnetic disk device and comprises a carriage movably mounted to the magnetic disk device and a supporting spring attached to the carriage and rotatable around a predetermined axis extending in a predetermined direction. The supporting spring holds the magnetic head to perform a seeking operation of the magnetic head in cooperation with the carriage. The head positioning mechanism further comprises a micro tracking actuator between the carriage and the supporting spring for making the supporting spring be rotated relative to the carriage to adjust a position of the magnetic head. In the head positioning mechanism, the micro tracking actuator comprises coil means held to one of the carriage and the supporting spring for generating magnetic flux in response to a flow of electric current therein and magnet means held to another of the carriage and the supporting spring to face the coil means in the predetermined direction. The magnet means traverses the magnetic flux to have a particular size which varies in accordance with a predetermined relation in response to a relative movement between the coil means and the magnet means.

According to another aspect of this invention, there is provided a head positioning mechanism for a magnetic disk device. The head positioning mechanism is for positioning a magnetic head on a magnetic disk set to the magnetic disk device and comprises a carriage movably mounted to the magnetic disk device and a supporting spring attached to the carriage and rotatable around a predetermined axis extending in a predetermined direction. The supporting spring holds the magnetic head to perform a seeking operation of the magnetic head in cooperation with the carriage. The head positioning mechanism further comprises a micro tracking actuator between the carriage and the supporting spring for making the supporting spring be rotated relative to the carriage to adjust a position of the magnetic head. In the head positioning mechanism, the micro tracking actuator comprises a pair of coils held to one of the carriage and the supporting spring for generating magnetic flux in response to a flow of electric current therein and magnet means held to another of the carriage and the supporting spring to face the coils in the predetermined direction.

According to still another aspect of this invention, there is provided a drive control method of driving a head positioning mechanism for a magnetic disk device. The head positioning mechanism is for positioning a magnetic head on a magnetic disk set to the magnetic disk device and comprises a carriage movably mounted to the magnetic disk device and a supporting spring attached to the carriage and rotatable around a predetermined axis extending in a predetermined direction. The supporting spring holds the magnetic head to perform a seeking operation of the magnetic head in cooperation with the carriage. The head positioning mechanism further comprises a micro tracking actuator between the carriage and the supporting spring for making the supporting spring be rotated relative to the carriage to adjust a position of the magnetic head. The micro tracking actuator comprises a pair of coils held to one of the carriage and the supporting spring each for generating magnetic flux in response to an electric current therein and magnet means held to another of the carriage and the supporting spring to face the coils in the predetermined direction. The drive control method comprises the steps of supplying, during movement of the carriage, the electric current to the coils in reverse to prevent the supporting spring from being rotated relative to the carriage and supplying, during a stop of the carriage, the electric current to the coils in a same direction to move the supporting spring relative to the carriage.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Before describing the preferred embodiments of the present invention, a conventional actuator will be specifically described hereinbelow, for the reader's better understanding of the present invention, by referring to FIG. 1.

Figure 1:
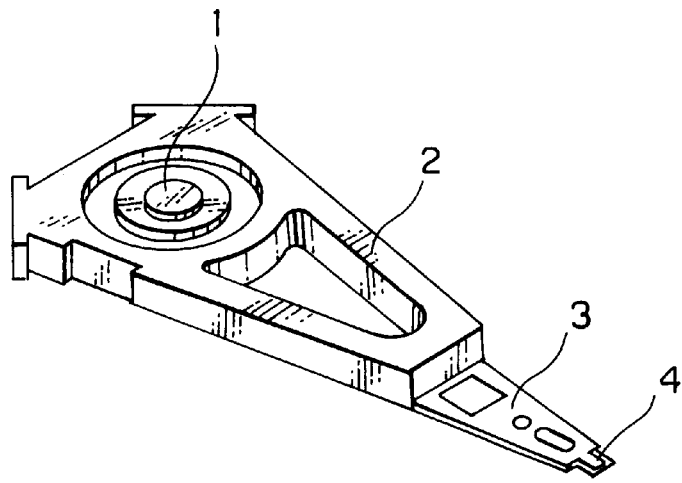
FIG. 1 is a perspective diagram showing a conventional actuator.

As illustrated in FIG. 1, a conventional magnetic device has: a carriage 2 connected to a main actuator 1; a supporting spring 3 connected with this carriage 2; and a magnetic head 4 provided at a tip end portion of the supporting spring 3.

The main actuator 1 causes the magnetic head 4 to perform a seeking operation of moving to a target track on a magnetic disk.

Meanwhile, as the storage density of a magnetic disk is considerably increased, the enhancement of the accuracy of positioning of the magnetic head 4 to a target track becomes a serious problem. It is, however, difficult to adapt the aforementioned magnetic disk device to the situation in which the storage density of a magnetic disk is considerably increased.

Therefore, there has been proposed a system which employs a micro tracking actuator (namely, a micro actuator) for moving each magnetic head 4 by a minute distance so as to enhance the accuracy of positioning of the magnetic head 4, aside from the main actuator 1.

For example, magnetic disk devices, each of which employs a minute displacement generating element as a micro tracking actuator, are disclosed in Japanese Unexamined Patent Publication Nos. 2-263369 and 4-232678 Official Gazettes, as prior art systems.

In the case that a seeking operation of moving a magnetic head to a target track of a magnetic disk is performed in each of these prior art systems, the (coarse) seeking operation of moving the magnetic head to the target track of the magnetic disk is performed by using the main actuator. During this seeking operation, the main actuator is at a standstill. Upon completion of the seeking operation of moving the magnetic head, the main actuator is stopped. Subsequently, a (fine or precise) seeking operation for precisely positioning the magnetic head is performed according to a position error signal as the next operation by using the minute displacement generating element.

Further, a magnetic disk device employing a micro tracking actuator of the high compliance type, which uses a magnetic force, is disclosed in Proceedings of the JSME (Japan Society of Mechanical Engineers) IIP (Information/Intelligence/Precision Instrument) Conference, 1996 (Proc. JSME IIP Conf. '96).

Figure 2:
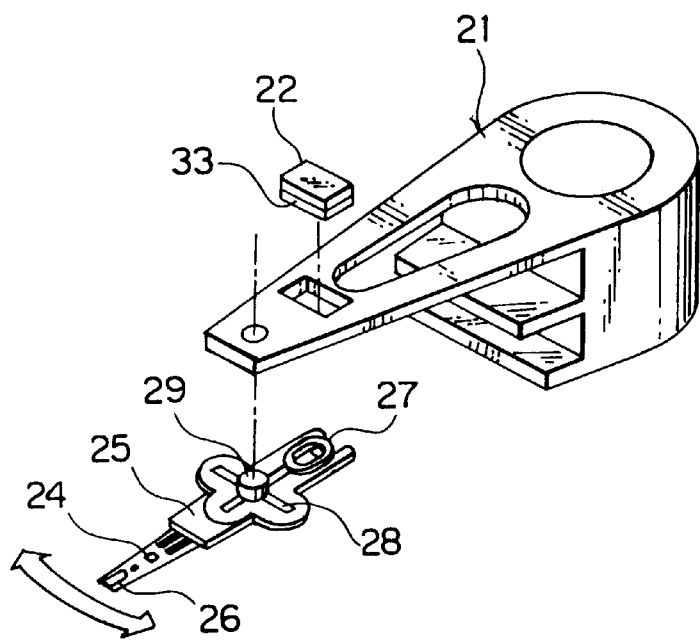
FIG. 2 is an exploded perspective diagram showing a conventional micro tracking actuator.

FIG. 2 shows the piggyback actuator structure of a micro tracking actuator. Yoke 22 and a magnet 23 are fixed to a carriage 21. Further, a coil 27 is fixed to a moving (or movable) portion 25 in such a manner as to face the magnet 23. Moreover, a supporting spring 24 is fixed to the moving portion 25 at a side opposite to this coil 27. Magnetic head 26 is provided at a tip end of the supporting spring 24. Furthermore, a cross-shaped (or X-shaped) spring 28 is provided on the moving portion 25. Bending of this cross-shaped spring 28 results in a swinging motion of the moving portion 25 around a stator shaft 29 fixed to the carriage 21.

However, as above described, the conventional micro tracking actuators respectively using the minute displacement generating element and the magnetic force have the drawbacks in that the practicality thereof is low and that the supporting spring vibrates owing to the seeking operation.

Figure 3:
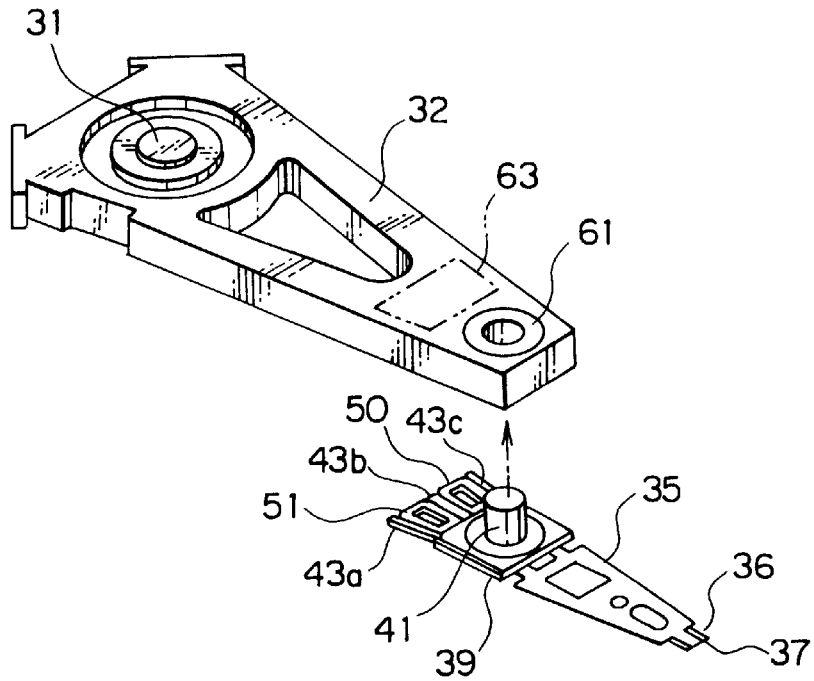
FIG. 3 is an exploded perspective diagram showing an example of a head positioning mechanism for a magnetic disk device, which has a micro tracking actuator of the present invention.

Hereinafter, the preferred embodiments of the head positioning mechanism for the magnetic disk device according to the present invention, and of the drive control method therefor will be described by referring to the accompanying drawings. FIG. 3 shows a head positioning mechanism of a magnetic disk device, which is provided with a micro tracking actuator.

Referring to FIG. 3, there is shown the head positioning mechanism for the magnetic disk device, which comprises a main actuator (or rotary actuator) 31, a carriage 32 connected to this main actuator 31; a supporting spring 35, a magnetic head 37 held at an end part of the supporting spring through a slider 36, a mounting member 39 connecting with the other end part of the supporting member 35, a stator shaft 41 provided on the mounting member 39 and having a predetermined axis extending in a predetermined direction, a plurality of coil supporting portions 43a, 43b and 43c connected to the mounting member 39 on a side opposite to the supporting spring 35, and first and second coils 50 and 51 respectively provided between the coil supporting portions 43b and 43c and between the coil supporting portions 43a and 43b.

Stator shaft frame 61 is provided at an end part of the carriage 32. Through hole 61a, into which the stator shaft 41 is rotatably fitted, is formed in the stator shaft frame 61. Moreover, a magnetic circuit 63 is provided in the carriage 32 in the rear of the stator shaft frame 61.

The first and second coils 50 and 51 have same magnetic characteristics and are equipped between the coil supporting portions 43b and 43c and between the coil supporting portions 43a and 43b, respectively. These first and second coils 50 and 51 are equipped therebetween in such a way as to face the carriage 32. Further, the magnetic circuit 63 is equipped in the carriage 32 in such a manner as to face the first and second coils 50 and 51. Incidentally, the first and second coils 50 and 51 and the magnetic circuit 63 operate as VCM (Voice Coil Motor).

Supporting coil 35 supports the magnetic head 37 on a surface of a magnetic disk 47 (see FIG. 4) in such a manner as to face this surface of the magnetic disk 47. Stator shaft 41 is fitted into the through hole 61a in such a manner that the supporting spring 35 can rotate along the surface of the magnetic disk 47. Carriage 32 has the other end portion connected to the main actuator 31 and rotates along the surface of the magnetic disk 47 together with the supporting spring 35.

Magnetic head 37 is attached to the slider 36 which serves a function of causing the magnetic head 37 to rise from the surface of the magnetic disk 47 and to float thereabove. This slider 36 is supported by the supporting spring 35. Mounting member 39 and the carriage 32 are rotatably coupled to each other by the stator shaft 41 and the stator shaft frame 61.

Figure 4:
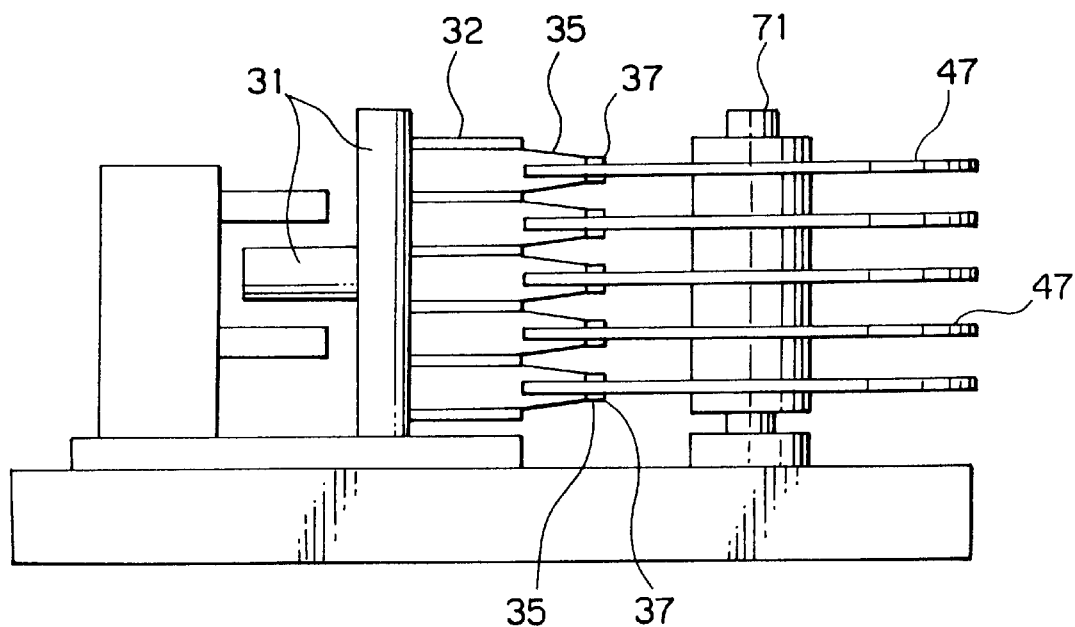
FIG. 4 is a diagram schematically illustrating the configuration of a magnetic disk device to which the example of the head positioning mechanism for the magnetic disk device according to the present invention is applied.

FIG. 4 shows a magnetic disk device to which the embodiment of the head positioning mechanism for the magnetic disk device according to the present invention is applied. Device of FIG. 4 will be described hereunder by assuming the presence of a plurality of magnetic disks 37 and a plurality of magnetic heads 47. Incidentally, this magnetic disk device may have only one magnetic disk 47 and only one magnetic head 37.

Referring to FIG. 4, the plurality of magnetic disks 47 disposed by being spaced out are rotatably held by a spindle 71. Each of the magnetic disks 47 is adapted so that data recorded on both surfaces thereof are read by the corresponding magnetic head 37.

Figure 5:
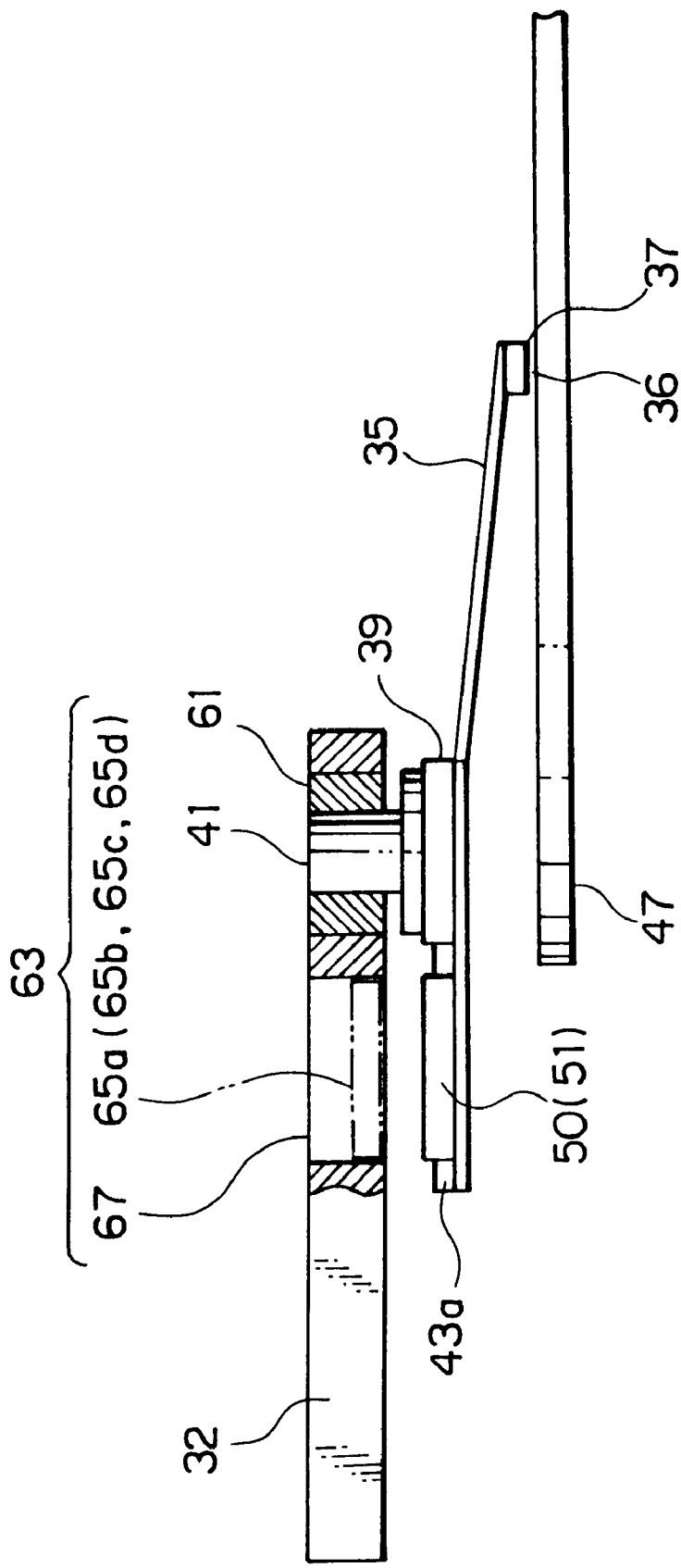
FIG. 5 is a partially sectional diagram showing the configuration of and the connection state between a carriage and a supporting spring that are illustrated in FIG. 1.
Figure 6:
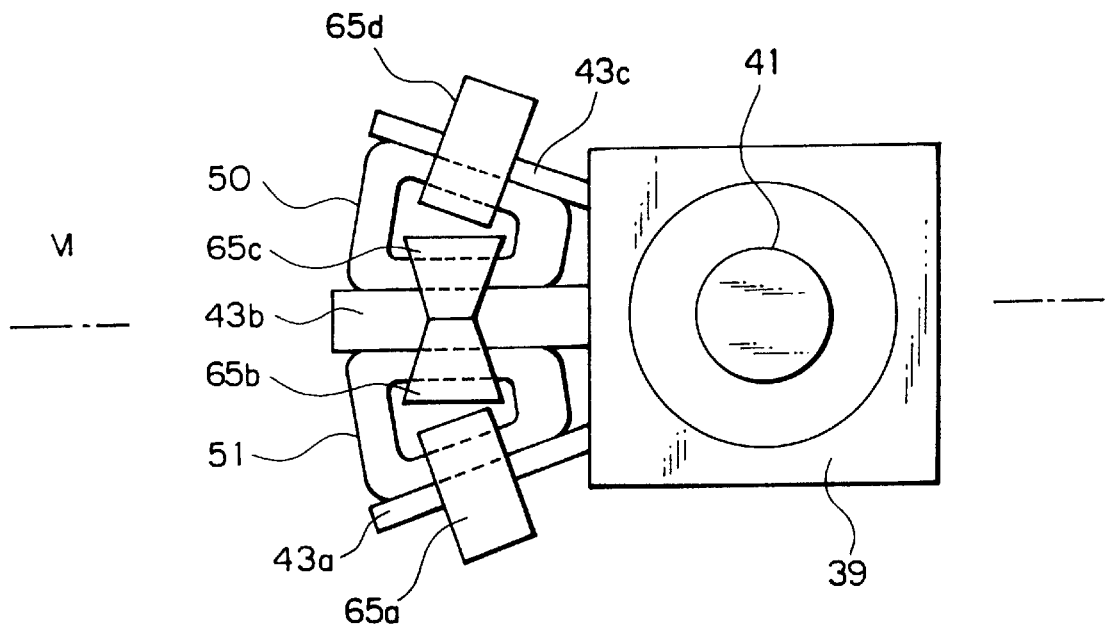
FIG. 6 is a diagram showing the configuration of a primary part of a first embodiment of the head positioning mechanism of the present invention.

As shown in FIG. 5, a plurality of magnets 65a, 65b, 65c and 65d (incidentally, four magnets are shown in FIG. 6) and a yoke 67, which serve as a magnet arrangement or a magnetic circuit 63, are provided on the carriage 32. First and second coils 50 and 51 are respectively equipped at places, which face the magnets 65a, 65b, 65c and 65d and the yoke 67 in the predetermined direction. As is apparent from FIG. 5, the magnets 65a, 65b, 65c and 65d directly face the first and second coils 50 and 51 by establishing a predetermined space between the magnets and the coils. Yoke 67 is provided on the magnets 65a, 65b, 65c and 65d. It is noted here that the magnets 65a–65d are arranged symmetrical with respect to a first plane including the predetermined axis and that each of the magnets 65a–65d has one of a trapezoidal shape and a rectangular shape in a second plane intersecting perpendicular to the predetermined axis.

Micro tracking actuator is composed of the first and second coils 50 and 51 and the magnetic circuit 63, the stator shaft 41 and the stator shaft frame 61. In the case of using this micro tracking actuator, the magnetic head 37 is adapted to move by a minute distance as the supporting spring 35 rotates.

Magnets 65a, 65b, 65c and 65d mounted on the carriage 32 are shown concretely as first to eighth embodiments in FIGS. 6 to 13. Further, the magnets 65a, 65b, 65c and 65d mounted on the carriage 32 are placed along a direction, in which the first and second coils 50 and 51 move, and are disposed in such a way as to be axially symmetrical with respect to an axis of symmetry VI shown in FIG. 6. Incidentally, the axis of symmetry VI is a center virtual axis passing through a portion between the first and second coils 50 and 51. Additionally, the axis of symmetry VI is on a line passing through the shaft center of the stator shaft 41 and the coil supporting portion 43b located at the central part of the carriage 32. Namely, the first and second coils 50 and 51 and the magnets 65a, 65b, 65c and 65d are disposed in such a way as to be axially symmetrical with respect to the common axis of symmetry VI.

Figure 14:
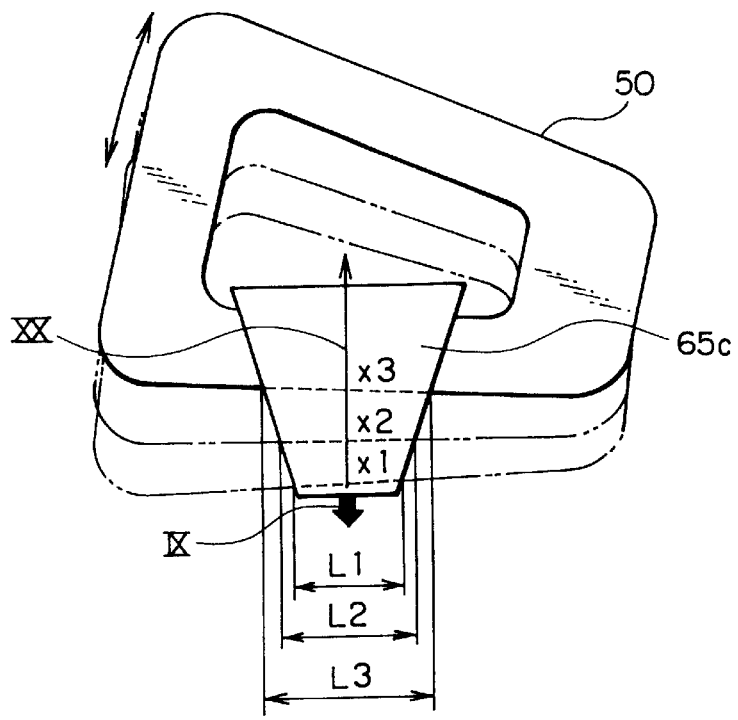
FIG. 14 is a graph illustrating the relation between the amount of movement of a coil and the length of a part of the coil traversing (or cutting across) magnetic flux (lines)
Figure 15:
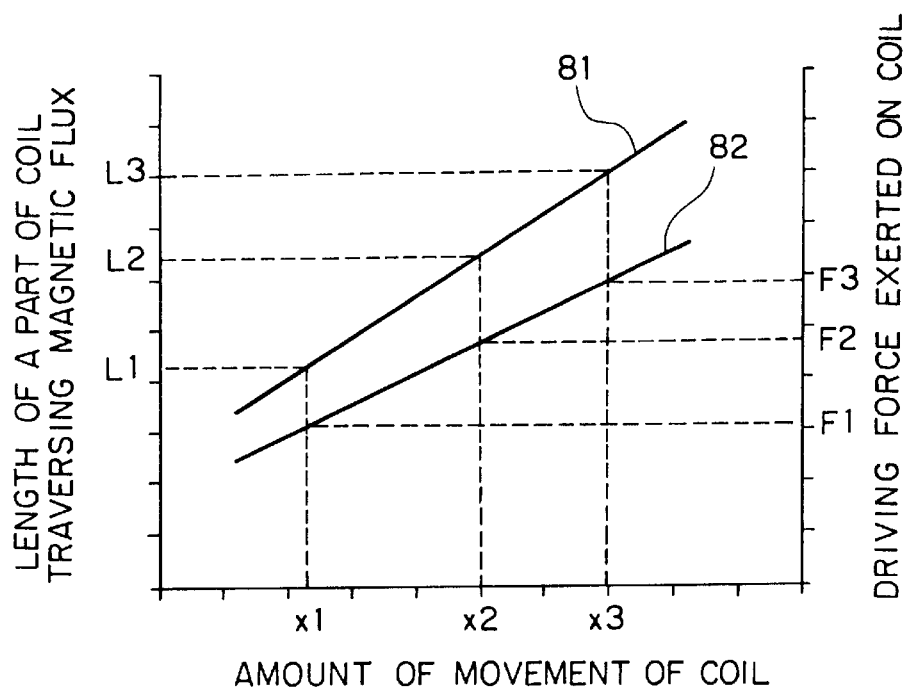
FIG. 15 is a graph illustrating the relation among the amount of movement of a coil, the length of a part of the coil traversing magnetic flux (lines) and the driving force exerted on the coil.

Further, magnets having shapes, by which the amounts x1, x2 and x3 of relative movement of each of the first and second coils 50 and 51 is proportional to variation in the length L1, L2, L3 of a part of each of the coils 50 and 51 traversing magnetic flux as illustrated in FIGS. 14 and 15, are used as the magnets 65a, 65b, 65c and 65d. That is, the magnet arrangement traverse the magnetic flux to have a particular size which varies in accordance with a predetermined relation in response to a relative movement between the coils and the magnet arrangement.

Hereunder, the lengths L1, L2, L3 of a part, which traverses the magnetic flux, of each of the coils 50 and 51 will be described. For instance, regarding the outermost periphery line of the coil having several turns, the lengths L1, L2 and L3 of the part traversing the magnetic flux generated by the magnet 65c of FIG. 14 are the lengths L1, L2 and L3 of a part, which traverses the magnetic flux and corresponds to the position of the first coil 50, of one turn thereof. Hereinafter, each of "the lengths L1, L2 and L3 of a part, which traverses the magnetic flux, of each of the coils 50 and 51" designates a sum of the length L1, L2 or L3 of corresponding parts (namely, parts corresponding to the part of the outermost periphery of the coil 50 or 51) of the turns of the coil 50 or 51.

Figure 16:
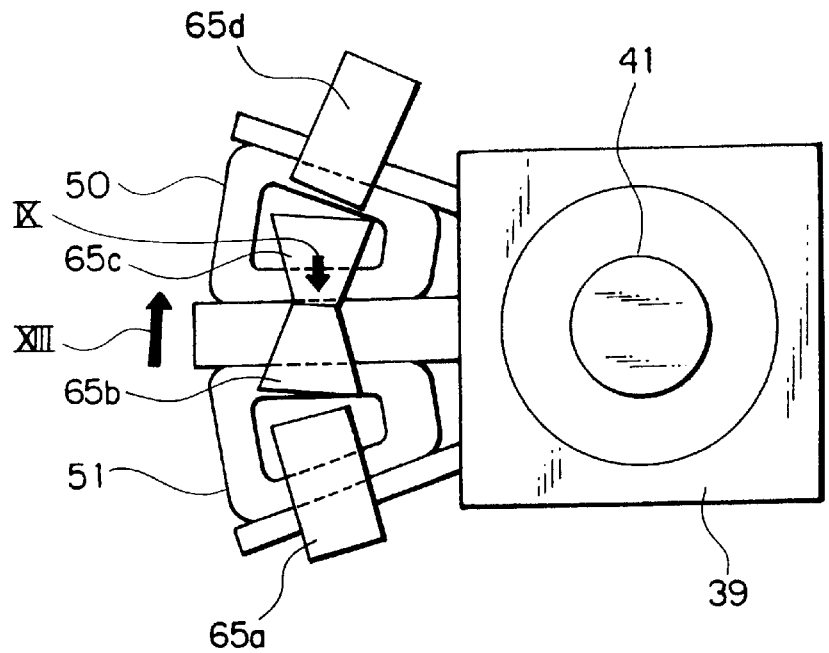
FIGS. 16 and 17 are diagrams each illustrating an operation of the micro tracking actuator.

In the case of employing this shape of the magnet 65c, each of the lengths L1, L2 and L3 of a part, which traverses the magnetic flux, of each of the coils 50 and 51 varies owing to a change in the relative positions of the supporting spring 35 and the carriage 32. Further, the driving force F1, F2, F3 exerted on each of the first and second coils 50 and 51 varies in such a way as to be proportional to the amount x1, x2, x3 of relative movement of each of the first and second coils 50 and 51 and to the amount of variation in the length L1, L2, L3 of a part, which traverses the magnetic flux, of each of the coils 50 and 51. For example, in the case that the magnets 65a, 65b, 65c and 65d have the shapes as shown in FIG. 16 (namely, the shapes similar to those of the magnets of FIG. 6), when the first coil 50 moves to a side as indicated by an arrow IX, the lengths L1, L2 and L3 of a part, which traverses the magnetic flux, of the first coil 50 decrease.

Figure 17:
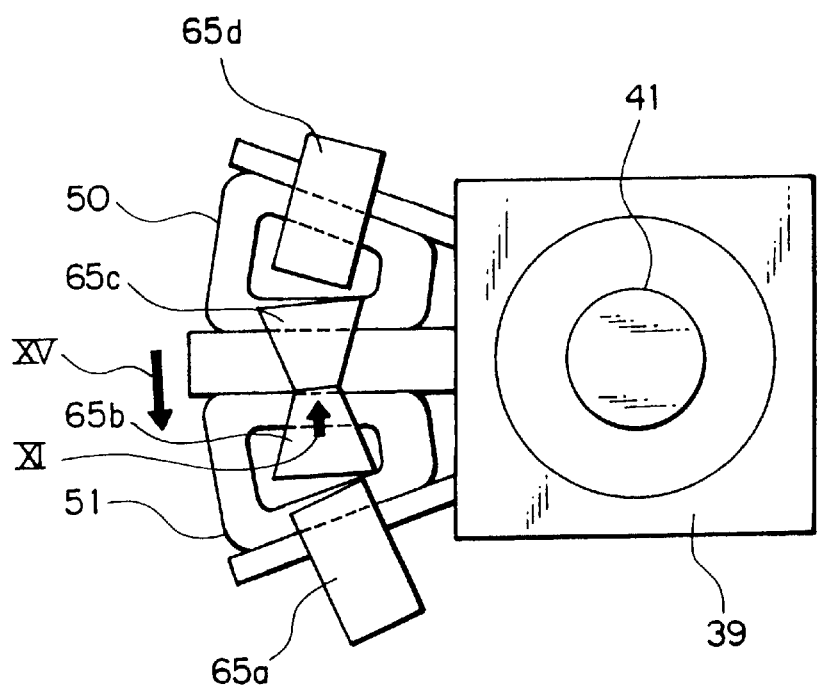

This results in reduction in the force exerted on the first coil 50. In contrast, the lengths L1, L2 and L3 of a part, which traverses the magnetic flux, of the second coil 51 increase. Thus, the force exerted on the second d coil 51 increases. Conversely, as shown in FIG. 17, when the second coil 51 moves to a side as indicated by an arrow XI, the lengths L1, L2 and L3 of a part, which traverses the magnetic flux, of the first coil 50 increase. Thus, the force exerted on the first coil 50 increases. Further, the lengths L1, L2 and L3 of a part, which traverses the magnetic flux, of the second coil 51 decrease. Thus, the force exerted on the second d coil 51 decreases. Then, in the case that equal amounts of driving currents are made to flow through the first and second coils 50 and 51 in such a manner that the driving forces are applied to the coils 50 and 51 in opposite directions (namely, in the case of this embodiment, inward directions), respectively, the length of a part, which traverses the magnetic flux, of the second coil 51 is different from the length of a part, which traverses the magnetic flux, of the first coil 50. Moreover, the supporting spring 35 is pushed back and fixed to the position of the axis of symmetry IV for the magnets 65a, 65b, 65c and 65d owing to the difference between the forces exerted on the magnets 65a, 65b, 65c, 65d in such a manner that the length of a part, which traverses the magnetic flux, of the second coil 51 becomes equal to the length of a part, which traverses the magnetic flux, of the first coil 50. Holding force at that time is determined by a driving current value I, a magnetic flux density B, an amount of movement of the coil x, and the ratio k of the amount of variation in the length of a part, which traverses the magnetic flux, of the coil to the amount of movement of the coil as expressed by the following equation (1):

Driving force:

$$F=IB(L+\Delta L)-IB(L-\Delta L)=2IB\Delta L=2IBkx \tag{1}$$

I: Driving current value
B: Magnetic flux density
L: Length of a part, which traverses magnetic flux of each of the coils, of each of the coils at the central position
ΔL: an amount of variation in the length of a part, which traverses magnetic flux, of each of the coils
x: an amount of movement of the coil from the center position k (=ΔL/x): a ratio k of the amount of variation in the length of a part, which traverses the magnetic flux, of the coil to the amount of movement of the coil When driving currents are made to flow through the first and second coils 50 and 51 so that driving forces, whose magnitudes are equal to each other, are exerted thereon and the micro tracking actuator is driven, a total length of parts, which traverse magnetic flux, of the first and second coils 50 and 51 becomes constant as regardless of the positions of the coils 50 and 51, as expressed by the following equation (2). In the case of this magnetic disk device, when the driving current value I is proportional to a force applied to the micro tracking actuator, this actuator performs an operation similar to that of the conventional micro tracking actuator.

Driving force:

$$F=IB(L+\Delta L)-IB(L-\Delta L)=2IB\Delta L \tag{2}$$

Hereinafter, the embodiments respectively having the different configurations of the magnets 65a, 65b, 65c and 65d will be described by referring to FIGS. 6 to 13. Incidentally, in each of these embodiments respectively illustrated in these figures, each of theses embodiments have magnetic poles in a direction (namely, an upward or downward direction) in which these magnets move.

Incidentally, trapezoids employed as the shape of each of the four magnets 65a, 65b, 65c and 65d are established so that the upper base side thereof is parallel with the lower base side thereof. Further, the upper base side thereof is shorter than the lower base side. Moreover, hereunder, two magnets 65a and 65d will be referred to as outer magnets. Furthermore, tow magnets 65b and 65c placed in the inside of these outer magnets 65a and 65d will be referred to as inner magnets.

In the case of the first embodiment illustrated in FIG. 6, each of inner two magnets 65b and 65c adjoining with each other at the center is formed like an axial symmetrical isosceles trapezoid in such a manner that the upper base sides thereof are directed inwardly. Namely, these magnets 65b and 65c are adjacent to each other and are in contact with each other at the upper base side thereof. Magnets having rectangular sections are placed in an axially symmetrical manner as opposed outer two magnets 65a and 65d facing each other in such a way as not to adjoin the two inner magnets 65b and 65c. In this case, to fix the supporting spring 35 to the carriage 32, electric currents are fed through the coils 50 and 51 in such a manner that the driving force exerted on the inner parts of the first and second coils 50 and 51 are attractive forces.

Incidentally, a group of the two inner magnets 65b and 65c and another group of the two outer magnets 65a and 65d are placed above the first and second coils 50 and 51 so that these groups simultaneously overlap the first and second coils 50 and 51, respectively. This configuration is employed similarly in the embodiments which will be described hereinbelow.

Figure 7:
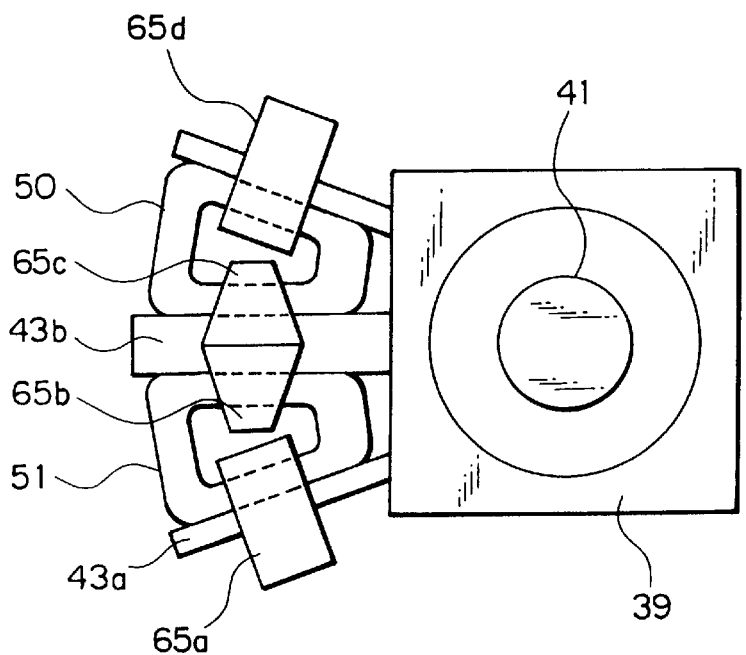
FIG. 7 is a diagram showing the configuration of a primary part of a second embodiment of the head positioning mechanism of the present invention.

In the case of the second embodiment of FIG. 7, two inner magnets 65b and 65c are placed in such a way that the upper base sides of these magnets are directed outwardly. Namely, these inner magnets 65b and 65c are placed in an axially symmetrical manner so that these magnets 65b and 65c are adjacent to each other and are in contact with each other at the lower base sides thereof. Two rectangular magnets are disposed in an axially symmetrical manner as the outer magnets 65a and 65d opposed in such a manner as not to adjoin the two inner magnets 65b and 65c. To fix the supporting spring 35 to the carriage 32, electric currents are fed through the first and second coils 50 and 51 so that the driving force exerted on the inner parts of the first and second coils 50 and 51 are repulsive forces.

Figure 8:
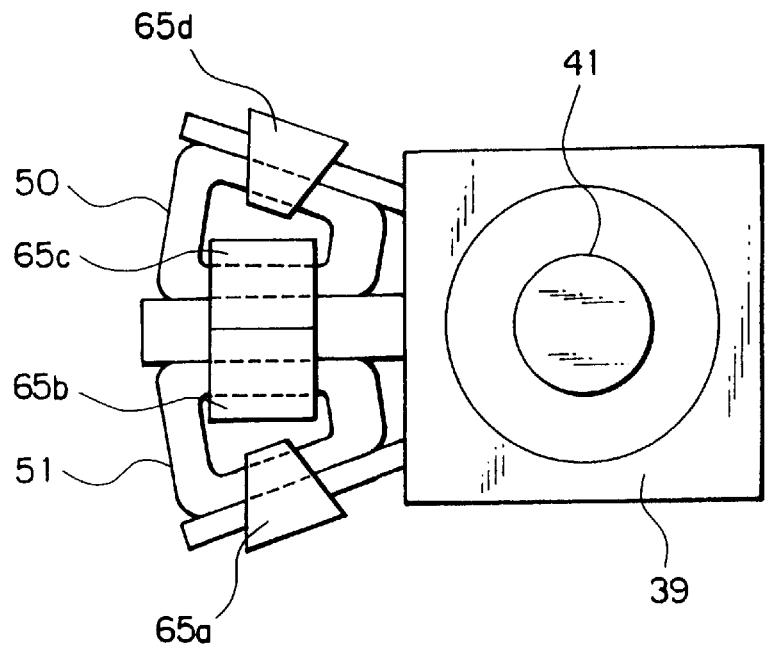
FIG. 8 is a diagram showing the configuration of a primary part of a third embodiment of the head positioning mechanism of the present invention.

In the case of the third embodiment illustrated in FIG. 8, rectangular adjacent magnets are placed in an axially symmetrical manner as the two inner magnets 65b and 65c, respectively. Each of two outer magnets 65a and 65d opposed in such a manner as not to adjoin the inner magnets 65b and 65c, respectively, is shaped in such a manner as to have a trapezoid section. Two outer magnets 65a and 65d are opposed to each other in such a fashion that the upper base sides of these outer magnets do not adjoin the two inner magnets 65b and 65c, respectively. To fix the supporting spring 35 to the carriage 32, electric currents are fed through the coils 50 and 51 in such a manner that the driving force exerted on the outer parts of the first and second coils 50 and 51 are attractive forces.

Figure 9:
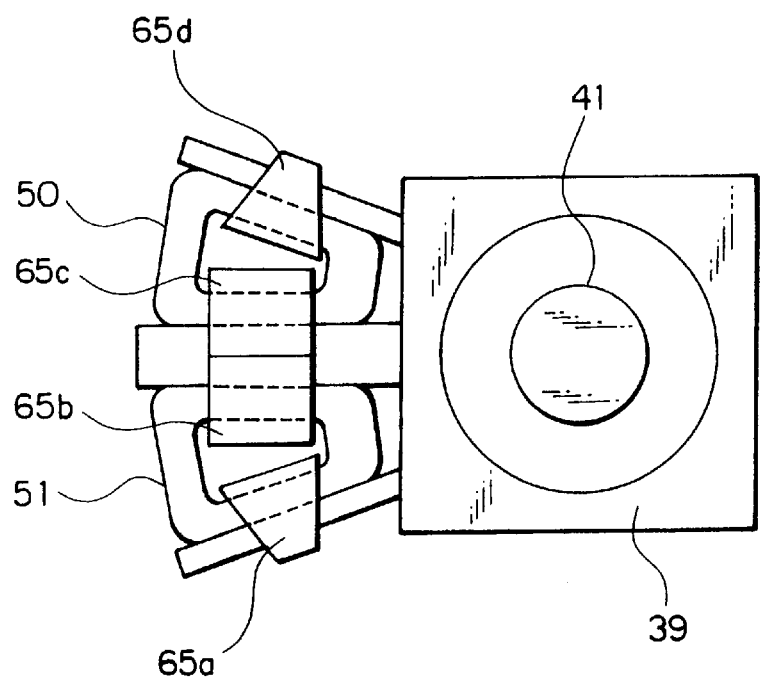
FIG. 9 is a diagram showing the configuration of a primary part of a fourth embodiment of the head positioning mechanism of the present invention.

In the case of the fourth embodiment illustrated in FIG. 9, magnets having rectangular sections are used as the two inner magnets 65b and 65c. Two outer magnets 65a and 65d are shaped so that the lower base sides of these outer magnets face the magnets 65b and 65c, respectively, and the outer magnets 65a and 65d has trapezoidal sections. To fix the supporting spring 35 to the carriage 32, electric currents are fed through the first and second coils 50 and 51 so that the driving force exerted on the outer parts of the first and second coils 50 and 51 are repulsive forces.

Figure 10:
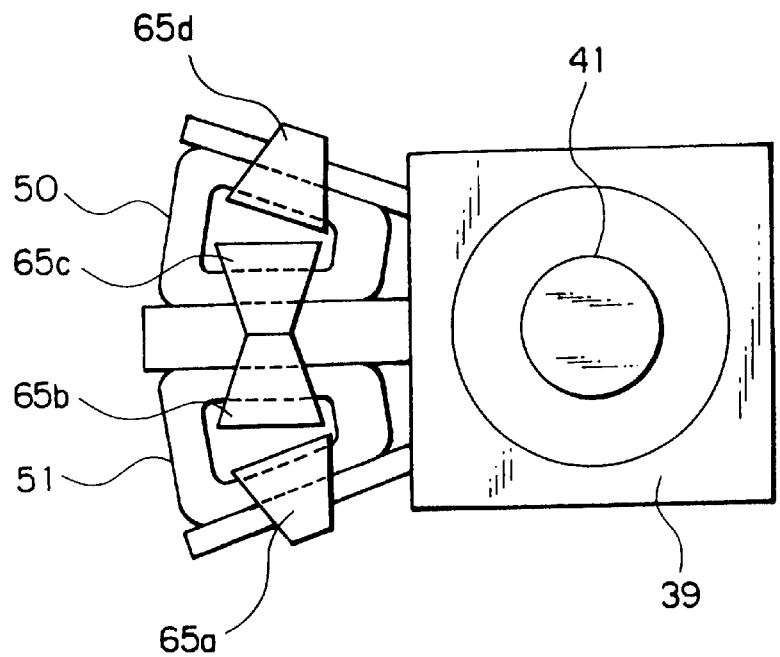
FIG. 10 is a diagram showing the configuration of a primary part of a fifth embodiment of the head positioning mechanism of the present invention.

In the case of the fifth embodiment shown in FIG. 10, opposed magnets, which have trapezoidal sections so that the upper base sides thereof adjoin each other, are used as the two inner magnets 65b and 65c. In contrast, the two outer magnets 65a and 65d are magnets placed so that the upper base sides thereof are directed outwardly. Namely, the two outer magnets 65a and 65d are placed so that the lower base sides of these outer magnets face the two inner magnets 65b and 65c, respectively. To fix the supporting spring 35 to the carriage 32, electric currents are fed through the first and second coils 50 and 51 so that the driving force exerted on the outer parts of the first and second coils 50 and 51 are repulsive forces.

Figure 11:
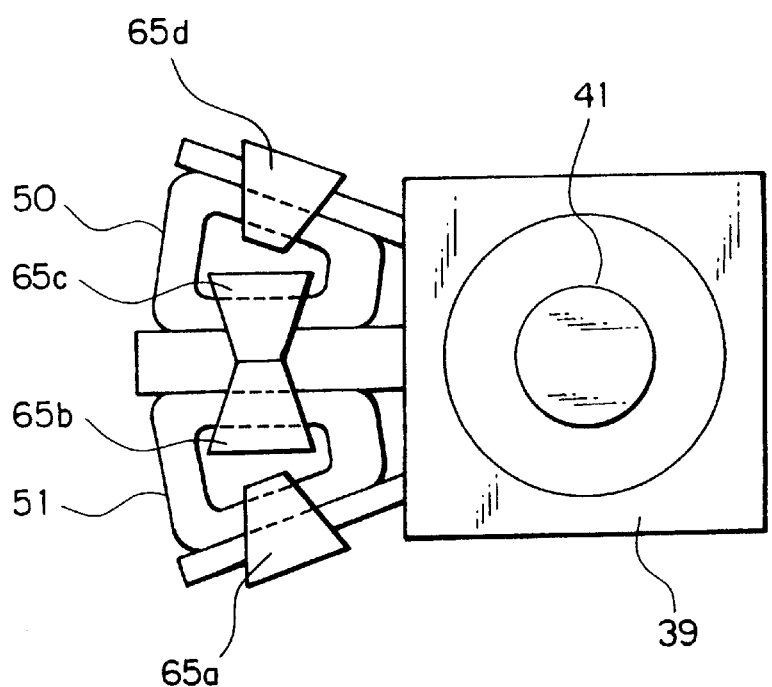
FIG. 11 is a diagram showing the configuration of a primary part of a sixth embodiment of the head positioning mechanism of the present invention.

In the case of the sixth embodiment shown in FIG. 11, magnets, which have trapezoidal sections, are used as the two inner magnets 65b and 65c. Two inner magnets 65b and 65c are placed in such a way as to adjoin each other at the upper base sides thereof. Two outer magnets 65a and 65d having trapezoidal sections are magnets placed so that the upper base sides thereof are directed inwardly. Namely, the two outer magnets 65a and 65d are placed so that the upper base sides of these outer magnets face the two inner magnets 65b and 65c, respectively. To fix the supporting spring 35 to the carriage 32, electric currents are fed through the first and second coils 50 and 51 so that the driving force exerted on the inner parts of the first and second coils 50 and 51 are attractive forces and that the driving force exerted on the outer parts of the first and second coils 50 and 51 are attractive forces.

Figure 12:
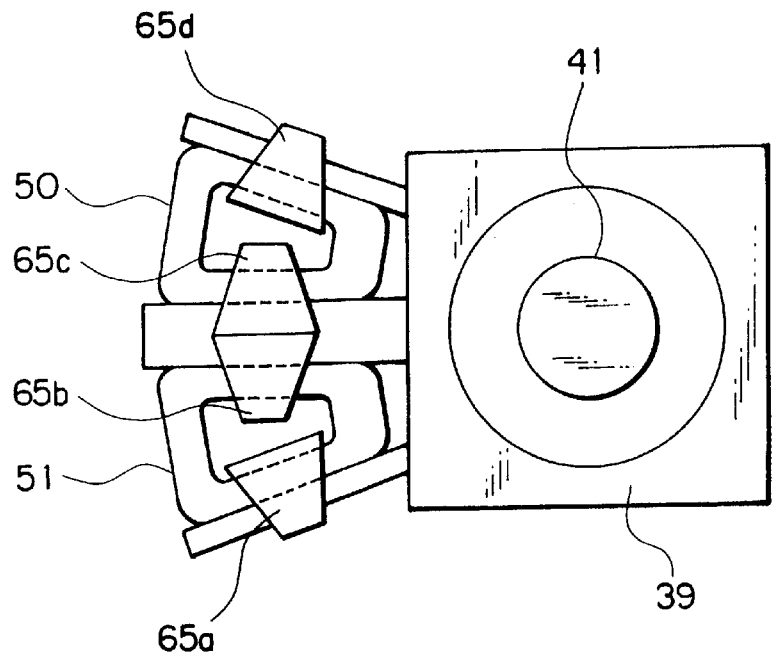
FIG. 12 is a diagram showing the configuration of a primary part of a seventh embodiment of the head positioning mechanism of the present invention.

In the case of the seventh embodiment of FIG. 12, all of two inner magnets 65b and 65c and two outer magnets 65a and 65d are placed in such a way that the upper base sides of these magnets have trapezoidal sections and are directed outwardly. To fix the supporting spring 35 to the carriage 32, electric currents are fed through the first and second coils 50 and 51 so that the driving force exerted on the inner parts of the first and second coils 50 and 51 are repulsive forces and that the driving force exerted on the outer parts of the first and second coils 50 and 51 are repulsive forces.

Figure 13:
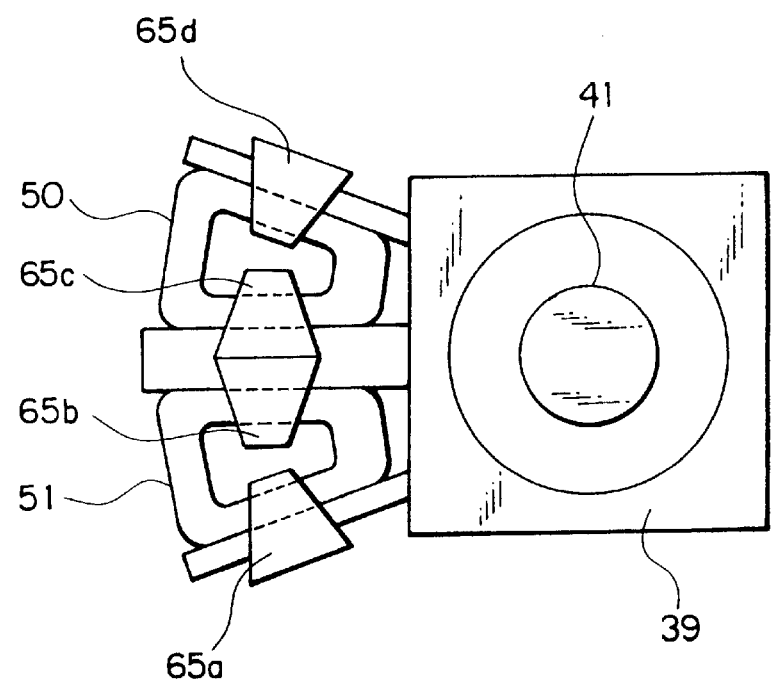
FIG. 13 is a diagram showing the configuration of a primary part of an eighth embodiment of the head positioning mechanism of the present invention.

In the case of the eighth embodiment shown in FIG. 13, magnets, which have trapezoidal sections, are used as the two inner magnets 65b and 65c. Magnets, which have trapezoidal sections and are placed so that the upper base sides of these outer magnets are directed inwardly, are used as two outer magnets 65a and 65d. To fix the supporting spring 35 to the carriage 32, electric currents are fed through the first and second coils 50 and 51 so that the driving force exerted on the inner parts of the first and second coils 50 and 51 are repulsive forces and that the driving force exerted on the outer parts of the first and second coils 50 and 51 are attractive forces.

FIG. 14 shows variations in the lengths L1, L2 and L3 of parts traversing magnetic flux corresponding to the outermost periphery of each of the coils, which are caused by the movement of the first coil 50 when the amounts x1, x2 and x3 of movement of each of the coils of the minute tracking actuator are minute. Incidentally, FIG. 14 illustrates the case, in which the two inner magnets 65b and 65c have trapezoidal horizontal sections as in the first embodiment shown in FIG. 6, by way of example.

Referring to FIG. 14, among the amounts x1, x2 and x3 of movement of the first coil 50, the relation expressed by the following equation (3) approximately holds when considering an arrow XX as an axis of coordinate:

$$(x3-x1)/(x2-X1)=(L3-L1)/(L2-L1) \qquad (3)$$

In FIG. 15, the axes of ordinate represent the length L1, L2 and L3 of the part, which traversing magnetic flux, of the first coil 50 and the driving force F1, F2, F3 exerted on the coil 50; and the axis of abscissa represents the amount X1, X2, X3 of movement of this coil. Incidentally, the proportional relation is established between the amount x1, x2, x3 of movement of the coil and the length L1, L2, L3 of the part, which traversing magnetic flux, of the coil, as indicated by the line 81 of the graph of FIG. 15. Thus, as is understood from the aforementioned equation (1), the amount x1, x2, x3 of movement of the coil is proportional to the driving force F1, F2, F3 applied to the coil as indicated by the line 82 the graph of FIG. 15. This holds true for the other line wound in such a manner as to form the coil having several turns. Thus, the relations represented by the lines 81 and 82 of the graph hold for the entire coils.

Hereinafter, based on the foregoing description, an operation of the micro tracking actuator will be described by referring to FIGS. 16 and 17. Referring to FIGS. 16 and 17, the supporting spring 35 rotates with respect to the carriage 32. Thus, the relative positions of the first and second coils 50 and 51 with respect to the magnets 65a, 65b, 65c and 65d are changed. At that time, the length of the part, which transverses the magnetic flux, of each of the coils is changed. Further, as above described, the driving forces respectively exerted on the first and second coils 50 and 51 vary. Accordingly, when driving currents are fed through the coils 50 and 51 so that driving forces, which have equal magnitude and act in opposite directions, are generated in the first and second coils 50 and 51, the magnitude of the driving force for driving the second coil 51 becomes larger than that of the driving force for driving the first coil 50 because the length of the part, which traversing the magnetic flux, of the second coil 51 is longer than that of the part, which traversing the magnetic flux, of the first coil 50.

At that time, the micro tracking actuator rotates in a direction from the second coil 51 to the fist coil 50, which is indicated by an arrow XIII. Further, in the case illustrated in FIG. 17, the magnitude of the driving force for driving the first coil 50 becomes larger than that of the driving force for driving the second coil 51 because the length of the part, which traversing the magnetic flux, of the first coil 50 is longer than that of the part, which traversing the magnetic flux, of the second coil 51. At that time, the micro tracking actuator rotates in a direction from the first coil 50 to the second coil 51, namely, in a direction indicated by an arrow XV.

As above described, in the state that the forces respectively exerted on the first and second coils 50 and 51 do not balance with each other, the micro tracking actuator rotates so that the length of the part, which traversing the magnetic flux, of the first coil 50 is equal to that of the part, which traversing the magnetic flux, of the second coil 51. For example, when the magnets 65a, 65b, 65c and 65d have trapezoidal horizontal sections and the amount of movement of the minute tracking actuator is minute, the amount of movement of the micro tracking actuator is proportional to the amount in variation in the length of the part, which traverses the magnetic flux, of the coil, as above stated. Consequently, the amount of variation in the difference between the lengths of the parts, which traverse the magnetic flux, of the coils is proportional to the amount of movement of the micro tracking actuator.

Moreover, because the vibration of the micro tracking actuator is attenuated by a damping force such as a frictional force caused on the stator shaft 41, the supporting spring 35 is fixed at a place where the forces applied to the first and second coils 50 and 51 balance with each other, as illustrated in FIG. 6.

Moreover, when the magnets 65a, 65b, 65c and 65d have trapezoidal horizontal sections and the amount of movement of the minute tracking actuator is minute, the amount of movement of the micro tracking actuator is proportional to the amount in variation in the length of the part, which traverses the magnetic flux, of the coil, as above described. Thus, the amount of variation in the difference between the lengths of the parts, which traverse the magnetic flux, of the first and second coils 50 and 51 is proportional to the amount of movement of the micro tracking actuator. Furthermore, because the vibration of the micro tracking actuator is attenuated by a damping force such as a frictional force caused on the stator shaft 41, the supporting spring 35 is fixed at a place where the forces applied to the first and second coils 50 and 51 balance with each other.

Thus, in the case that the supporting spring 35 vibrates without having sufficient damping elements, there is the necessity for providing a composing element, by which the vibration of the supporting spring 35 is rapidly attenuated, on the stator shaft 41. Such a composing element is required to connecting the stator shaft 41 with the stator shaft frame 61 by using, for instance, rubber.

Further, as indicated by the equation (2), in the case that the amount of movement of the micro tracking actuator is made by using the axially symmetrical first and second coils 50 and 51 to be proportional to the amount in variation in the lengths of the part, which traversing the magnetic flux, of these coils, a sum of the lengths of the part, which traversing the magnetic flux, of these coils becomes constant. Thus, when moving the supporting spring 35, the force constant (or factor) does not vary but the driving current is proportional to the driving force exerted on the coil if driving currents are fed through the first and second coils 50 and 51 in a direction so that the driving forces applied to these coils have same magnitude but are exerted in opposite directions.

Next, an accessing operation of accessing the magnetic disk 47 will be described hereinbelow by referring to FIGS. 18 and 19.

Figure 18:
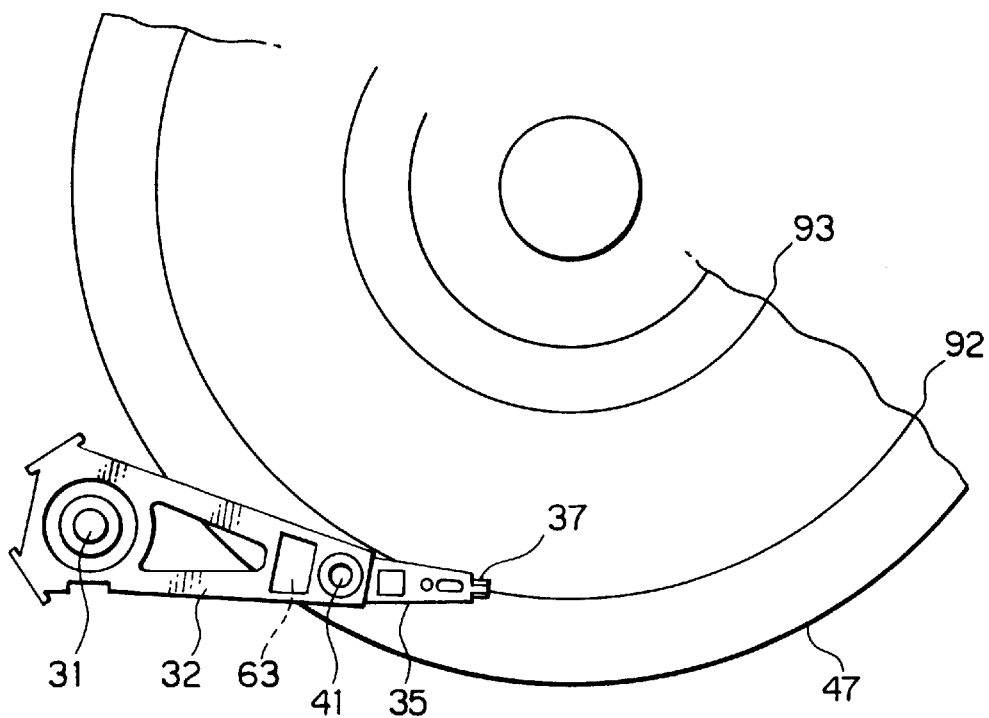
FIGS. 18 and 19 are diagrams each illustrating an operation of accessing a magnetic disk medium.

Referring to FIG. 18, when an access starting instruction is received in a state (hereunder referred to as a track following operation state) in which the magnetic head 37 follows a certain track 92, driving currents are supplied through the first and second coils 50 and 51 of the micro tracking actuator so that the driving forces, which have an equal magnitude and are applied in opposite directions, are exerted on the first and second coils 50 and 51. Consequently, the supporting spring 35 is fixed to the central position.

Figure 19:
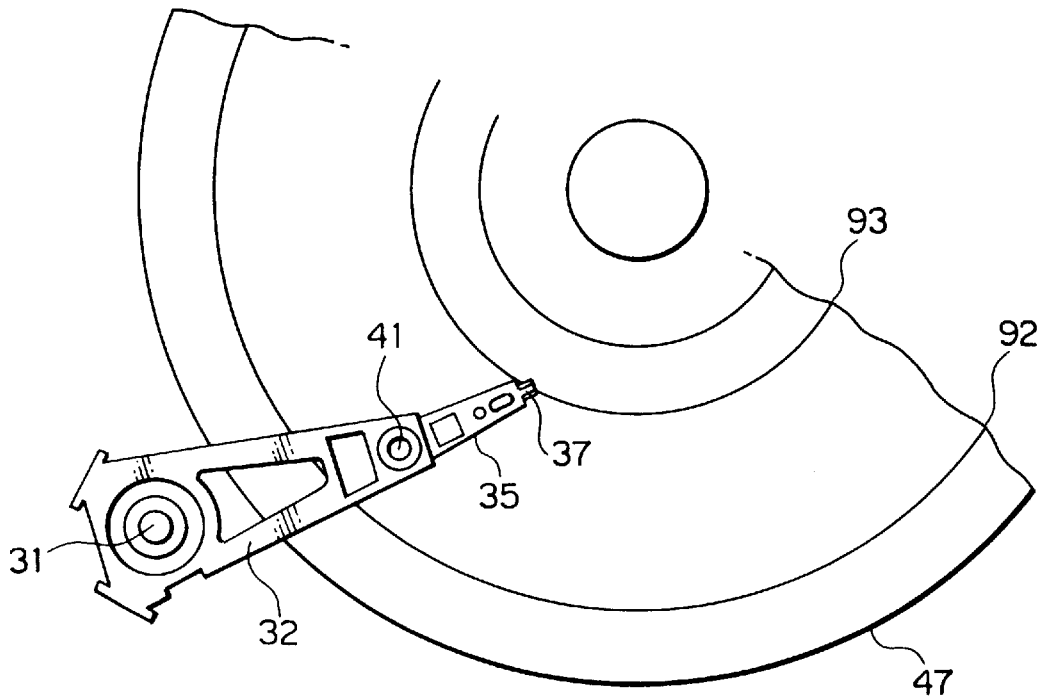

In this state, the magnetic head 37 is moved to a target track 93 by using the main actuator 31, as illustrated in FIG. 19. Then, at the time when the magnetic head 37 reaches a place in the vicinity of the center of the target track 83, driving currents, whose magnitudes are equal to one another, are fed through the coils by reversing the direction in which the driving current flows through one of the coils of the micro tracking actuator. At that time, the micro tracking actuator is driven, so that the magnetic head is made to follow the center of the target track 93. Signals representing such driving currents are used as control signals for setting the magnetic head 37 at the center of the target track 93 according to a position error signal obtained from the magnetic head 37 and for causing the magnetic head 37 to follow the center of the target track 93.

For example, a control signal for PID (Proportional plus Integral plus Derivative) control system or a lead/lag filter adapted to receive position error information, which is generated from the position error signal and represents the position error between the center of the target track 93 and the magnetic head 37, is inputted to the micro tracking actuator to thereby casing the magnetic head 37 to follow the center of the target track 93. At that time, the main actuator 31 is prevented from rotating or is fixed by setting a driving current for the main actuator 31 at zero or by feeding a minute current, which is used for coping with an external force, therethrough. Such a minute current value is measured on-line and is stored by making the magnetic head follow the center of the target track 93 only by using the main actuator 31 during the micro tracking actuator is fixed to the center position by the aforementioned method.

During the track following operation, data is read and written by causing the magnetic head 37 to the center of the target track 93. During that, the track following operation is performed by feeding driving currents through the first and second coils 50 and 51 of the micro tracking actuator so that the driving forces have the equal magnitudes and act in the same direction, and by utilizing the fact that the driving current is proportional to the driving force.

However, even when the main actuator 31 is fixed as above described, the relative angle determined by the carriage 32 and the supporting spring 35 varies with time owing to drift or the like. Further, there is the possibility that the supporting spring 35 moves to a movable limit thereof when things come to the worst. Thus, during the track following operation, there is the need for performing a calibration operation so as to put the supporting spring 35 to the center position. Namely, the calibration operation is to put back the micro tracking actuator to the neutral position by reversing the direction, in which the driving current flows through one of the coils of the micro tracking actuator, and by feeding the driving currents through the coils 50 and 51 by which the driving forces exerted thereon have equal magnitudes and act in opposite directions. In the case of this operation, the magnetic head 37 may get out of a read/write region, which data can be read from and written to. It is, therefore, preferable that this operation is performed during no data is read therefrom and written thereto. For instance, it is desirable that this operation is performed after a predetermined time period is elapsed since the last calibration, or during no data is read and written.

In accordance with the present invention, even when there occurs a shift of the axis VI of symmetry, which corresponds to the first and second coils 50 and 51, from the axis IV of symmetry, which corresponds to the magnets 65*a*, 65*b*, 65*c* and 65*d*, a resultant force is made to act in a direction, in which the shift is canceled or reduced to zero, by feeding electric currents through the first and second coils 50 and 51 in predetermined directions. Thus, during accessing data, the relative angle between the supporting spring 35 and the carriage 32 can be fixed to a certain constant value. Consequently, a stable accessing operation can be achieved.

Especially, the amount of variation in the length of the part, which traverses the magnetic flux, of each of the coils is made to be proportional to the amount of relative displacement between the magnets 65*a*, 65*b*, 65*c* and 65*d* and the first and second coils 50 and 51 by forming the magnets 65*a*, 65*b*, 65*c* and 65*d* in such a way as to have trapezoidal or rectangular horizontal sections and by combining the magnets having the trapezoidal horizontal sections with the magnets having the rectangular horizontal sections.

Furthermore, a resultant force can be made to act in a direction, in which the supporting spring 35 rotates, on the first and second coils 50 and 51 by reversing the electric current to be fed through one of the coils from the state in which the supporting spring 35 is fixed. Thus, the micro tracking actuator of the present invention can perform the functions of the conventional micro tracking actuator by employing a physically single configuration. Moreover, the reduction in size of the mechanism can be achieved.

In this case, the proportional relation can be established between the driving current and the driving force of the micro tracking actuator. Thus, the position control of the magnetic head can be easily achieved by the micro tracking actuator.

Consequently, the present invention can provide an excellent head positioning mechanism for a magnetic disk device, which has advantageous effects that cannot be obtained by the prior art, and a drive control method therefor.

Although the preferred embodiments of the present invention have been described above, it should be understood that the present invention is not limited thereto and that other modifications will be apparent to those skilled in the art without departing from the spirit of the invention.

What is claimed is:

1. A head positioning mechanism for a magnetic disk device, said head positioning mechanism being for positioning a magnetic head on a magnetic disk set to said magnetic disk device and comprising:

a carriage movably mounted to said magnetic disk device;

a supporting spring attached to said carriage and rotatable around a predetermined axis extending in a predetermined direction, said supporting spring holding said magnetic head to perform a seeking operation of said magnetic head in cooperation with said carriage; and a micro tracking actuator between said carriage and said supporting spring for making said supporting spring be rotated relative to said carriage to adjust a position of said magnetic head, said micro tracking actuator comprising:

coil means held to one of said carriage and said supporting spring for generating magnetic flux in response to a flow of electric current therein; and magnet means held to another of said carriage and said supporting spring to face said coil means in said predetermined direction, said magnet means traversing said magnetic flux and having a plurality of independent segments lying in the same plane, wherein at least one of said independent segments varies in size substantially along its entirety in a direction of relative movement between said coil means and said magnet means.

2. A head positioning mechanism as claimed in claim 1, wherein said size varies proportionally to said relative movement.

3. A head positioning mechanism as claimed in claim 1, wherein said micro tracking actuator further comprises:

a mounting member connected to said supporting spring for mounting one of said coil means and said magnet means;

a stator shaft connected to said mounting member and extending along said predetermined axis; and hole defining means connected to said carriage and defining a through hole in which said stator shaft is rotatably inserted.

4. A head positioning mechanism as claimed in claim 1, wherein said coil means comprises a pair of coils which are arranged symmetrical with respect to a first plane including said predetermined axis.

5. A head positioning mechanism as claimed in claim 4, wherein said magnet means comprises a pair of magnets which are arranged symmetrical with respect to said first plane and face said coils, respectively.

6. A head positioning mechanism as claimed in claim 5, wherein each of said magnets has a trapezoidal shape in a second plane intersecting rectangular to said predetermined axis.

7. A head positioning mechanism as claimed in claim 4, wherein said magnet means comprises:

two inner magnets placed in such a manner as to adjoin at a center therebetween; and two outer magnets placed outside said inner magnets by being apart from said inner magnets by a predetermined distance, respectively, said two inner magnets having trapezoidal sections and having magnetic poles at lower base sides thereof and being placed in such a manner as to be symmetrical with respect to said first plane so that lower base sides thereof face each other.

8. A head positioning mechanism as claimed in claim 4, wherein said magnet means comprises:

two inner magnets placed in such a manner as to adjoin at a center therebetween; and two outer magnets placed outside said inner magnets by being apart from said inner magnets by a predetermined distance, respectively, said two inner magnets having trapezoidal sections and having magnetic poles at lower base sides thereof and being placed in such a manner as to be symmetrical with respect to said first plane so that lower base sides thereof face each other, said two outer magnets having trapezoidal sections and being placed outside said two inner magnets by being apart from said two inner magnets by a predetermined distance, respectively.

9. A head positioning mechanism as claimed in claim 4, wherein said magnet means comprises:

two inner magnets placed in such a manner as to adjoin at a center therebetween;; and two outer magnets placed outside said inner magnets by being apart from said inner magnets by a predetermined distance, respectively, said two inner magnets having trapezoidal sections and having magnetic poles at lower base sides thereof and being placed in such a manner as to be axially symmetrical with respect to the movement direction so that lower base sides thereof face each other, said two outer magnets having rectangular sections and being placed outside said two inner magnets by being apart form said two inner magnets by a predetermined distance, respectively.

10. A head positioning mechanism as claimed in claim 4, wherein said magnet means comprises:

two inner magnets placed in such a manner as to adjoin at a center therebetween; and two outer magnets placed outside said inner magnets by being apart from said inner magnets by a predetermined distance, respectively, said two inner magnets having rectangular sections and having magnetic poles at lower base sides thereof and being placed in such a manner as to be axially symmetrical with respect to the movement direction so that lower base sides thereof face each other, said two outer magnets having trapezoidal sections and being placed outside said two inner, magnets by being apart from said two inner magnets by a predetermined distance, respectively.

\* \* \* \* \*

UNITED STATES PATENT AND TRADEMARK OFFICE
CERTIFICATE OF CORRECTION

PATENT NO.: 6,043,957
DATED: March 28, 2000
INVENTOR(S): Toshiro HATTORI; Hiroshi KAJITANI; Masatomo MIZUTA; Yoshiho YANAGITA It is certified that error(s) appears in the above-identified patent and that said Letters Patent is hereby corrected as shown below:

Column 4, line 6 delete "23" insert --33--
line 64 delete "23" insert --33--

Signed and Sealed this

Third Day of April, 2001

Attest:

NICHOLAS P. GODICI

*Attesting Officer*     Acting Director of the United States Patent and Trademark Office